Patented Apr. 30, 1929.

1,711,164

UNITED STATES PATENT OFFICE.

ROGER ADAMS, OF URBANA, ILLINOIS, ASSIGNOR TO THE NEWPORT COMPANY, OF CARROLLVILLE, WISCONSIN, A CORPORATION OF DELAWARE.

2',4'-DIHALOGEN-5'-METHYL-ORTHO-BENZOYL-BENZOIC ACID AND PROCESS OF MAKING THE SAME.

No Drawing.   Application filed March 28, 1927.   Serial No. 179,193.

This invention relates to 2',4'-dihalogen-5'-methyl-ortho-benzoyl-benzoic acid and to a process of making the same.

It is an object of this invention to provide ortho-benzoyl-benzoic acid substitution products suitable for use as starting materials for intermediates in the manufacture of dyes and related chemicals and to provide a simple, efficient method for their production on a technical or commercial scale.

Other and further important objects of this invention will become apparent from the following description and appended claims.

I have now discovered that 2,4-di-halogenated-toluenes may be condensed with phthalic anhydride in the presence of a suitable condensing agent, such as anhydrous aluminum chloride and anhydrous ferric chloride, to form the corresponding substituted ortho-benzoyl-benzoic-acids.

This reaction may be carried out with great ease and smoothness and compounds suitable for use as starting materials for dyestuff intermediates thus made technically available. The facility with which the reaction proceeds is contrary to what might be expected, since after condensation there are four hydrogen atoms in the original benzene ring replaced by other groups.

The reaction is best expressed by the following chemical equation, wherein "X" represents a halogen atom.

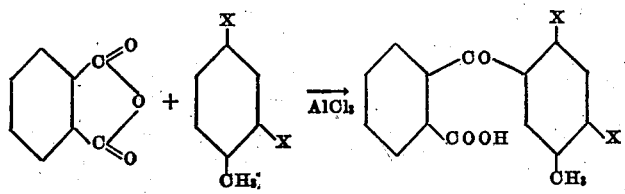

2',4'-dichloro-5'-methyl-ortho-benzoyl-benzoic acid is a white crystalline solid, having a melting point, after repeated crystallizations of 140° C.

Without limiting my invention to any particular procedure, the following examples will serve to illustrate my preferred method.

METHOD OF PREPARATION.

*Example I. 2',4'-dichloro-5'-methyl-ortho-benzoyl-benzoic acid.*

A mixture of 20 parts of phthalic anhydride, 69 parts of 2–4 dichloro-toluene and 50 parts anhydrous aluminum chloride are warmed together for eight hours. The reaction mass is then decomposed in the usual way with hydrochloric acid and the excess dichloro-toluene distilled off with steam. After purification from toluene, the product 2',4'-dichloro-5'-methyl-ortho-benzoyl-benzoic acid is obtained in the form of white crystals having a melting point of 140° C.

*Example II. 2',4'-dibromo-5'-methyl-ortho-benzoyl-benzoic acid.*

Same procedure as Example I except using the molecular proportion of 2,4 dibromo-toluene instead of 2,4 dichloro-toluene.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. A process of preparing 2',4'-dihalogen-5'-methyl-ortho-benzoyl-benzoic acid, which comprises condensing 2,4 dihalogen toluene with phthalic anhydride.

2. A process of preparing 2',4'-dihalogen-5'-methyl-ortho-benzoyl-benzoic acid, which comprises condensing 2,4 dihalogen toluene with phthalic anhydride in the presence of anhydrous aluminum chloride as condensing agent.

3. A process of preparing 2',4'-dichloro-5'-methyl-ortho-benzoyl-benzoic acid, which comprises condensing 2,4 dichloro toluene with phthalic anhydride in the presence of anhydrous aluminum chloride as condensing agent.

4. A process of preparing 2',4'-dihalogen-5'-methyl-ortho-benzoyl-benzoic acid, which comprises heating together phthalic anhydride, 2,4-dihalogen toluene and anhydrous aluminum chloride, decomposing the reaction mass with hydrochloric acid and distilling off the excess dihalogen toluene.

5. As new articles of manufacture, 2',4'-dihalogen-5'-methyl-ortho-benzoyl-benzoic acids having the following formula, wherein X represents a halogen atom.

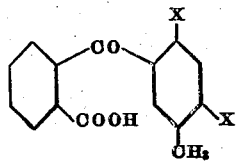

6. As a new article of manufacture, 2',4'-dichloro-5'-methyl-ortho-benzoyl-benzoic acid, having the following formula.

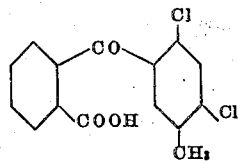

In testimony whereof I have hereunto subscribed my name at Urbana, Champaign County, Illinois.

ROGER ADAMS.